Feb. 16, 1932.  J. H. CHAMBERS  1,845,126
CHANGE SPEED GEAR
Filed April 8, 1929  8 Sheets-Sheet 1

J. H. Chambers
INVENTOR

Feb. 16, 1932.   J. H. CHAMBERS   1,845,126
CHANGE SPEED GEAR
Filed April 8, 1929   8 Sheets-Sheet 2
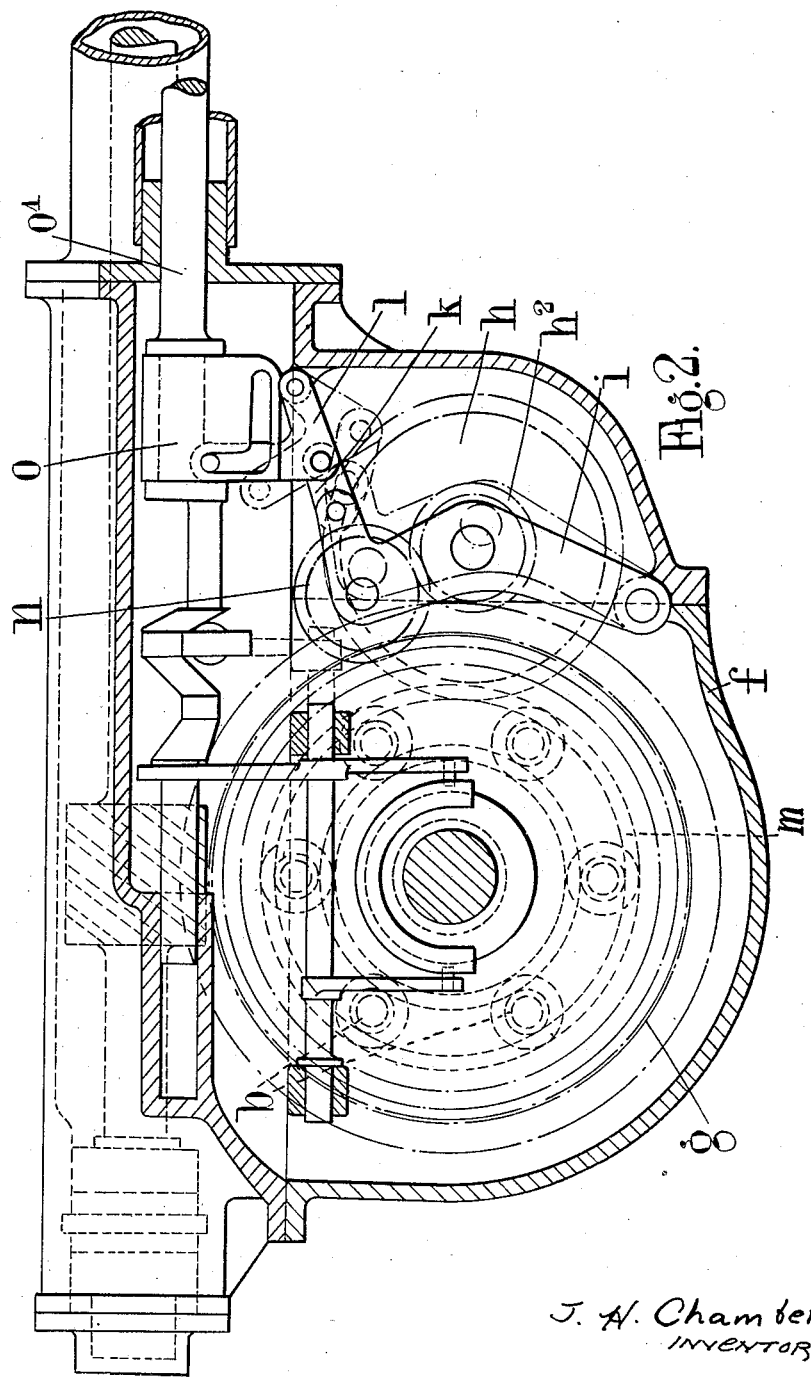
J. H. Chambers
INVENTOR
By Marks & Clerk
Attys.

Feb. 16, 1932.  J. H. CHAMBERS  1,845,126
CHANGE SPEED GEAR
Filed April 8, 1929  8 Sheets-Sheet 3

J. H. Chambers
INVENTOR
By Marks & Clerk

Feb. 16, 1932.　　J. H. CHAMBERS　　1,845,126
CHANGE SPEED GEAR
Filed April 8, 1929　　8 Sheets-Sheet 4

J. H. Chambers
INVENTOR

Feb. 16, 1932. J. H. CHAMBERS 1,845,126
CHANGE SPEED GEAR
Filed April 8, 1929  8 Sheets-Sheet 5

J. H. Chambers
INVENTOR

By: Marlo & Clen
Attys.

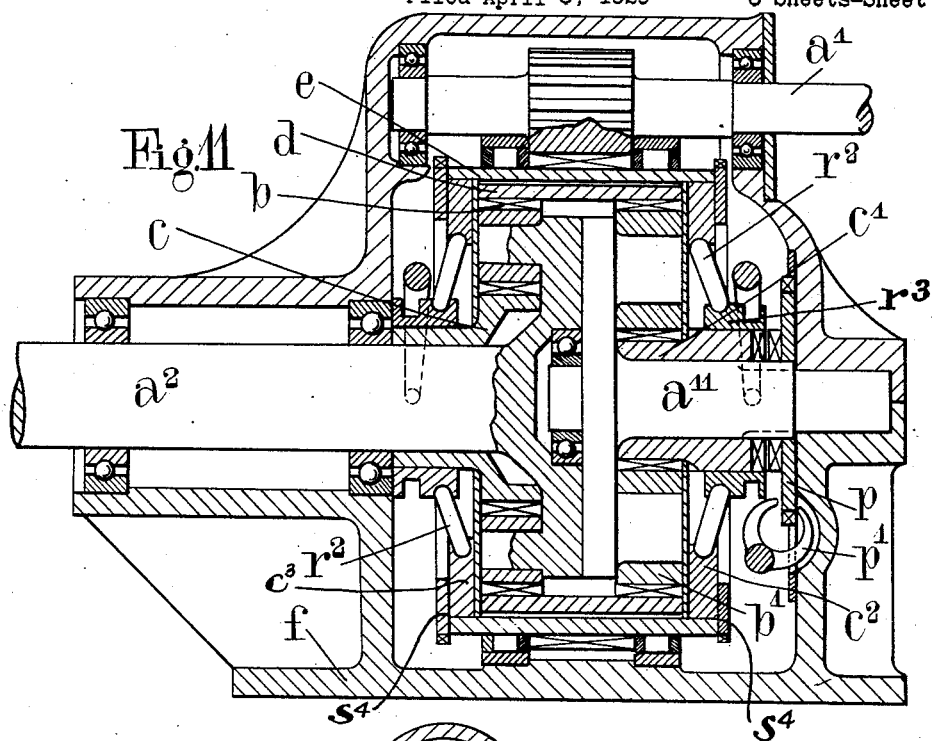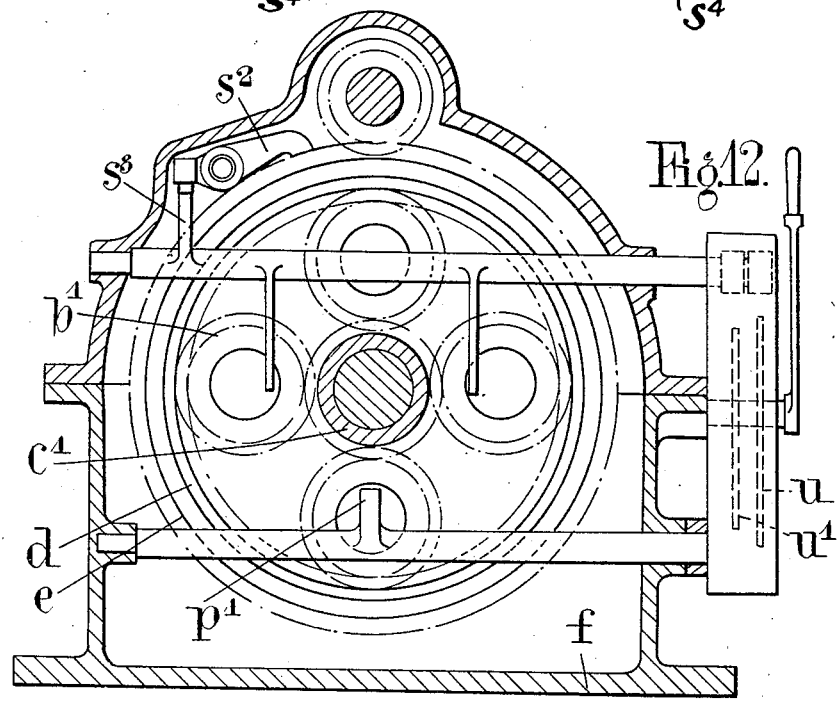

Feb. 16, 1932.  J. H. CHAMBERS  1,845,126
CHANGE SPEED GEAR
Filed April 8, 1929   8 Sheets-Sheet 8
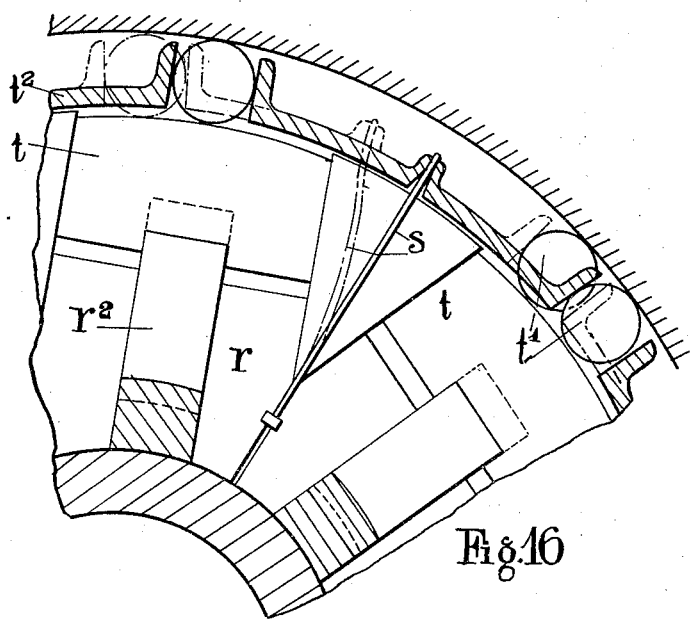
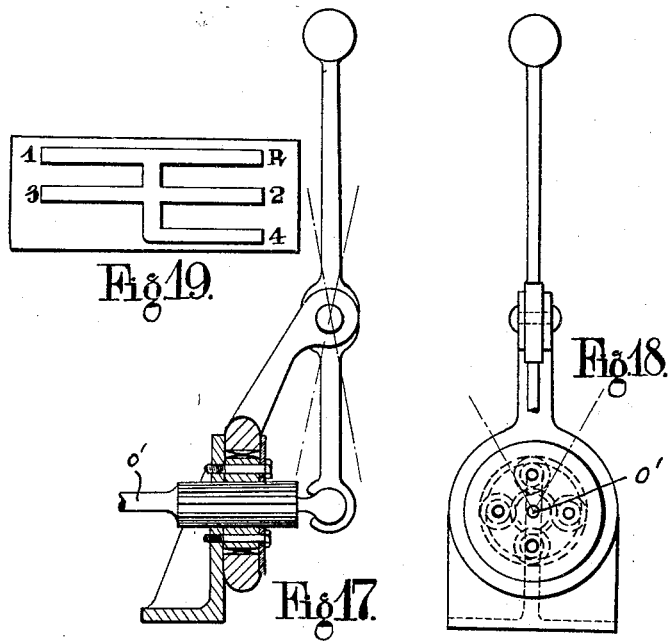

Patented Feb. 16, 1932

1,845,126

UNITED STATES PATENT OFFICE

JOHN HENRY CHAMBERS, OF BELFAST, IRELAND

CHANGE SPEED GEAR

Application filed April 8, 1929, Serial No. 353,506, and in Great Britain April 14, 1928.

This invention relates to change speed gears of the kind in which an epicyclic train is employed comprising an encircling driving member.

This invention also relates to change speed gears of the kind in which an epicyclic train is employed comprising an encircling driving member, and embodying also an external driving gear for the purpose of giving a slow speed and reverse.

Change speed gear of the kind referred to in the preceding paragraph is described in my prior United States Patent No. 1,488,381.

The object of the present invention is to devise improvements in the construction and arrangement of gears of the above character such that the stresses imposed may be taken up in the most advantageous manner while the general efficiency of the gear in operation will be considerably increased and its manipulation in practice will be greatly facilitated.

The invention consists in a change speed gear of the kind referred to having an externally driven ring or like member for first and reverse, such member being concentric with the main gear drive.

The invention also consists in a change speed gear of the kind referred to having a secondary epicyclic gear adapted to give the first or low speed and reverse.

The invention further consists in a change speed gear of the kind referred to in which the external gear is driven from a gear wheel attached to the encircling driver.

The invention still further consists in other details and arrangements hereinafter described or indicated.

The accompanying drawings illustrate several modes of carrying out the invention.

Figure 2 is a part sectional end elevation and

Figure 11 is a longitudinal sectional elevation of a further form of gearing in accordance with the invention.

Figure 12 is an end view of Figure 11 with parts removed.

Figure 16 is a view of an alternative form of clutch, and

Figures 17, 18 and 19 are views illustrating details in connection with the gear change mechanism.

Figure 1:
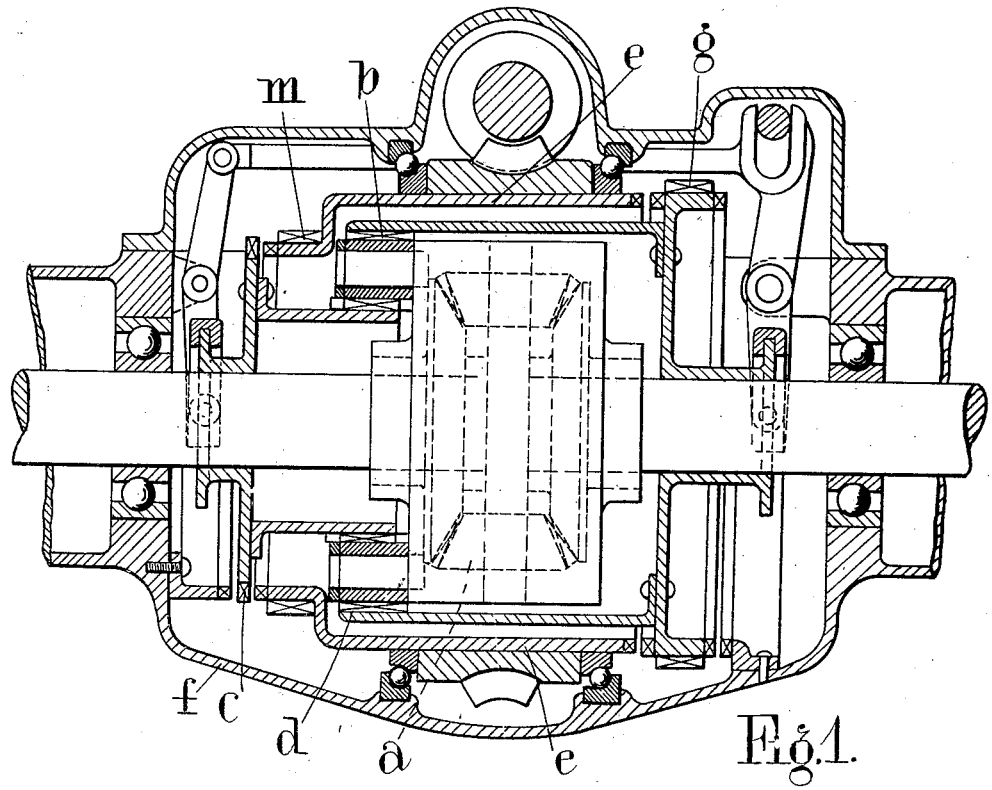
Figure 1 is a longitudinal sectional elevation of one form of gear constructed and arranged in accordance with the invention.
Figure 3:
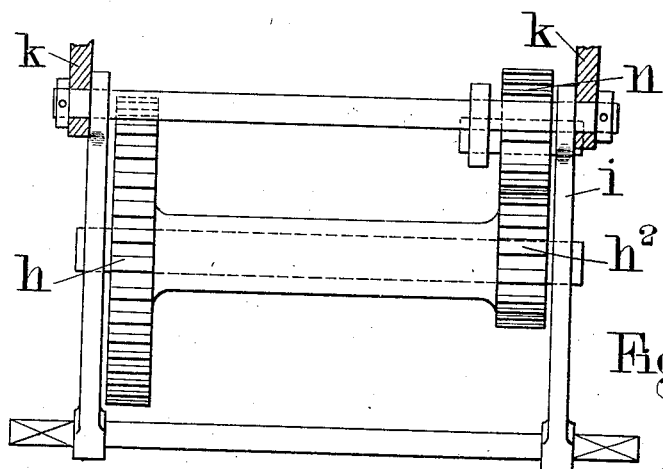
Figure 3 is a view illustrating a detail.

In carrying my invention into effect in one convenient manner as, for example, in its application to the production of a change speed gear suitable for a self-propelled vehicle and as illustrated in Figures 1 to 3, I provide a differential $a$ with an epicyclic gear comprising planet wheels $b$ carried by the differential casing and a sun wheel $c$, the planet wheels being enclosed within an annular wheel or ring $d$ and the whole being surrounded by a driving sleeve or member $e$.

Dog clutches, roller or friction clutches for the purpose of clutching the members as may be necessary are also provided and those members requiring to be clutched or declutched to the fixed gear case $f$ or to one another may be adapted to be slidable or may otherwise be suitably arranged for the purpose.

In order to provide for the first speed and reverse I provide a gear wheel $g$ attached to or formed in one with the encircling ring member $d$, and such gear wheel is adapted to be engaged by a wheel $n$ carried upon a shaft mounted in swinging levers $i$ adapted to be moved radially into or out of the engaging position by means of toggle levers $k$ $l$, one of which ($l$) may be in the form of a bell crank and adapted to be actuated by any suitable form of control mechanism. The toggle levers are preferably arranged so that when the gears are in the engaging position as shown by full lines in Figure 2 the toggle levers are themselves in line and preferably also in line with the point of contact of the gears so that thereby the latter are maintained properly in mesh.

The driving means for the external gear is constituted by the gear wheel $m$ mounted upon or formed in one with the encircling driver $e$, such gear wheel being adapted to drive the wheel $h$ and through the short shaft and pinion $h^2$ to an idler $n$ engaging with the gear wheel $g$ so that the necessary slow backward rotation of the ring $d$ may thus be obtained.

The sun wheel and encircling ring member $d$ are capable of sliding endwise movement and are controlled by forked levers or otherwise so that by means of the external gear first speed is secured by clutching the sun wheel $c$ to the driver and reverse when the sun wheel is clutched to the casing.

For the fourth or top speed both sun wheel and ring member are clutched to the driving member so that a direct drive is obtained from the propeller shaft to the differential.

For the third speed the sun wheel is clutched to the gear box or other fixed member while the ring or annular wheel is revolved by being clutched to the driving member.

The second speed is obtained by the converse arrangement in which the ring or annular wheel is held fixed while the sun wheel is coupled to the driving member.

The toggle link mechanism may be controlled separately or in combination with a general control gear by the longitudinal movement of a slotted member $o$ mounted upon the control shaft, $o^1$, the member $o$ being free to rotate but not being free to move endwise upon the control shaft $o^1$.

Where necessary or desirable the various swinging links, toggle levers and bell cranks or like mechanisms may be duplicated so as to be arranged symmetrically about the centre of the gearing to secure greater rigidity of engagement.

Figure 4:
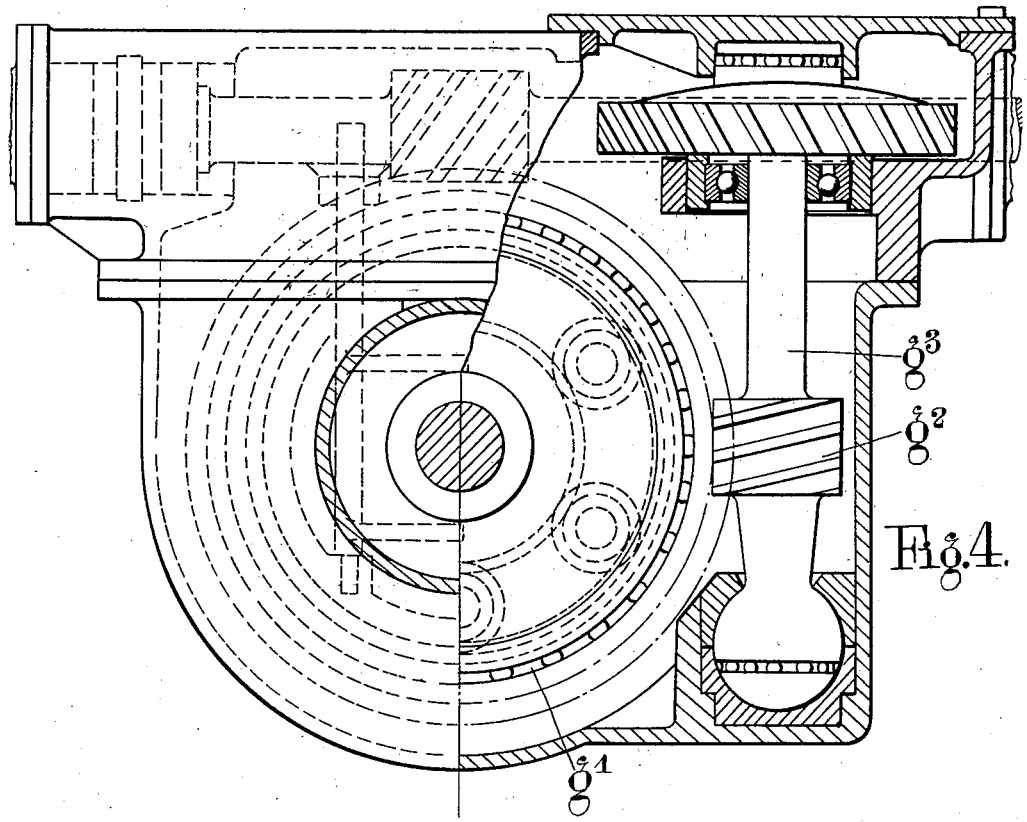
Figure 4 is a part sectional end elevation of a second from of gear in accordance with the invention.
Figure 8:
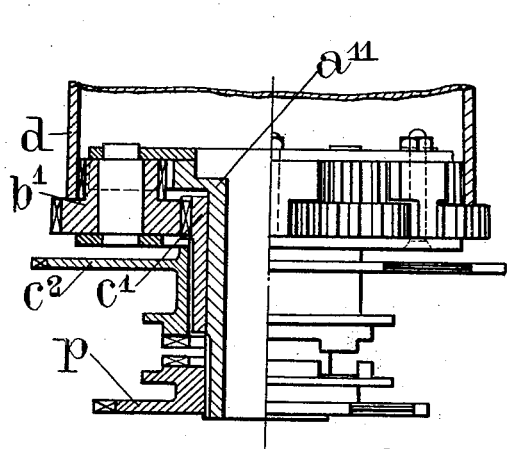
Figure 6 is a plan view of the gearing in a further form with the casing removed and Figures 7 to 9 are views illustrating some details of the gearing as shown in Figure 6.
Figure 9:
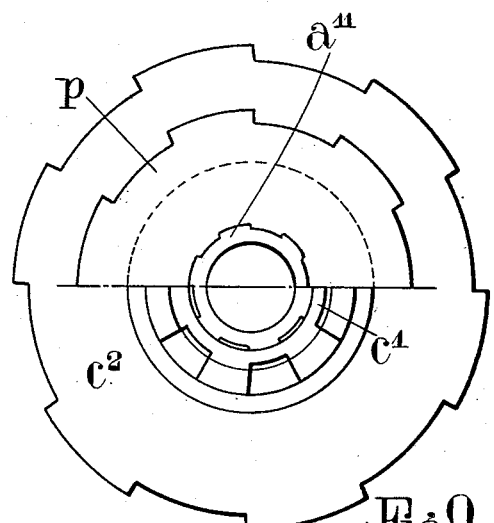
Figure 5:
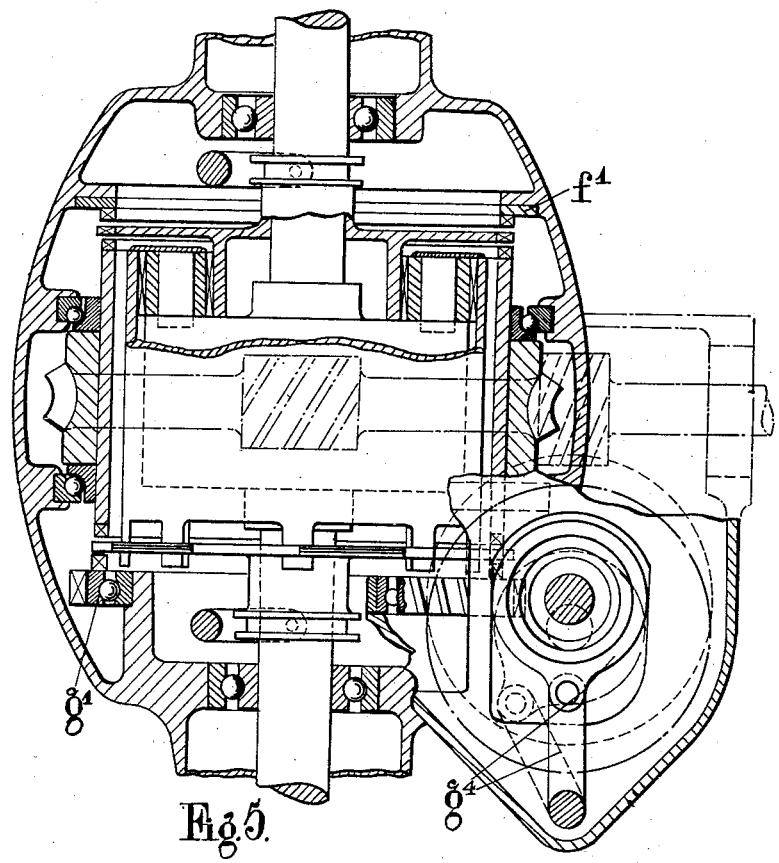
Figure 5 is a sectional plan of Figure 4.
Figure 7:
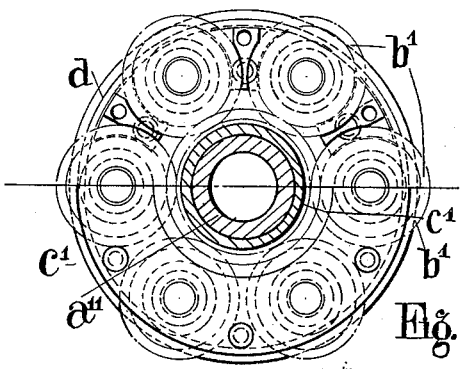
Figure 13:
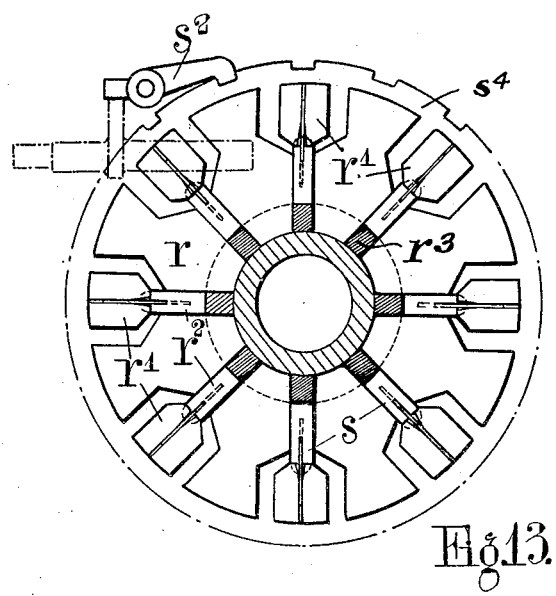
Figures 13, 14 and 15 are views illustrating one convenient form of clutch in accordance with the invention.

In a modification of the invention shown in Figures 4 and 5 I may, instead of having external gear teeth on the ring member of the epicyclic train, employ a separate gear ring $g^1$ on ball bearings and to which the said ring member may be clutched and from which it may be de-clutched. This separate gear ring is capable of being held stationary by a detent pawl or other device attached to the casing, or of being driven by a pinion or it may be a worm wheel driven by a worm $g^2$ or may be otherwise suitably arranged. In the case where the gear comprises a worm and worm wheel as shown the worm $g^2$ may be carried upon a ball ended or other tiltable spindle $g^3$ so that by means of a suitable toggle lever mechanism $g^4$ operated by a convenient control the actuating worm may be brought into or out of engagement with its worm wheel as desired. The swinging motion of the worm spindle $g^3$ enables the worm to be moved into such a position in relation to the worm wheel and to such an extent that the inclination of the worm threads will cause a locking of the worm wheel and thus automatically come into action as a holder so as to dispense with the use of pawls or detents upon the fixed casing as above referred to. In other forms, however, embodying this separate gear wheel it may be arranged to be locked when necessary by a separate detent or pawl, (such as shown in Figure 13), and in some arrangements I may provide a clutch or clutches for the purpose of putting the gear into and out of operation in place of having a swinging or sliding gear wheel or a tiltable worm as described.

First and reverse speeds are secured as described with reference to the foregoing modification.

In a still further modification in accordance with the invention I may provide a secondary epicyclic gear to fulfil the functions of the external gear for giving the first speed and a reverse, the gear being arranged so as not to function when either the fourth, third or second speed is required.

Figures 11 and 12 illustrate a form of this modification of the invention as applied to an ordinary reduction gear in which there is no differential such as is required in connection with a self-propelled vehicle, $a^1$ being the driving shaft and $a^2$ the driven.

The main epicyclic gear with its outer encircling ring and outer driving ring is substantially similar to that hereinbefore described with the exception that the clutching arrangements shown in connection therewith differ somewhat as will be apparent from the description given hereafter.

The secondary epicyclic gear comprises the planets $b^1$, the planetary cage or carrier $a^{11}$, the sun wheel $c^1$ and the outer ring $d$ formed as a floating member and common to both primary and secondary epicyclic trains and driver $e$ also in common with the main epicyclic. The sun wheel $c^1$ is free on its shaft but may be clutched thereto by means of the clutch plate $p$ movable by means of the control lever $p^1$.

The secondary epicyclic train is locked or put out of action by engaging the inner dog clutch on $p$ with the corresponding clutch on the sun wheel $c^1$, thus the planetary cage and the sun wheel $c^1$ are locked together and remain so for speeds 4, 3 and 2. This member therefore acts as part of the ring member $d$ for these speeds.

For first speed and reverse this dog clutch is opened by sliding the movable plate $p$ along the splines on its shaft and at the same time the series of dogs on its outer edge engage with corresponding dogs on the fixed casing; this engagement holds the planetary cage stationary and by actuating the driving clutch $c^2$ into engagement with the driving member $e$ the planets are revolved as idlers on their fixed pins and transmit a slow backward motion to the ring member $d$. Whilst the secondary epicyclic is thus in action first speed forward is secured by clutching the main sun wheel $c$ to the driving member $e$ and reverse when the sun wheel $c$ is clutched to the casing. In the arrangement shown (Figures 12 and 13) external pawls $s^2$ are employed to engage with notched rings $s^4$ as holders for the sun wheel $c$ and ring member $d$ for speeds 3 and 2 and are brought into action by cams $s^3$ on the spindles of the clutch actuating forks.

Second speed is obtained when planetary carrier $a^{11}$ is clutched to sun wheel $c^1$ which is also held to the casing by pawls $s^2$, the secondary epicyclic being out of action as before stated, and the ring $d$ is stationary. The clutch $c^2$ is disengaged and the clutch $c^3$ is engaged and the drive will be to the sun wheel $c$ giving rotation of the planetary cage.

For third speed the planetary carrier $a^{11}$ is clutched to sun wheel $c^1$ and clutch $c^3$ is disengaged. The clutch $c^2$ is engaged and becomes the driver of the ring $d$, (the planetary cage and sun wheel $c^1$ being solid with the ring $d$ as described) and the planetary cage of the primary epicyclic moves round the fixed sun wheel $c$.

For fourth speed clutches $c^2$ and $c^3$ both come into action to give a direct drive.

The combination of primary and secondary epicyclics and external floating ring member may be employed as a simple reduction gear, in which case no clutches will be necessary but the parts would be simply bolted together and the principle of operation would be similar to that above described for first speed. In a modification of this part of the invention the sun-wheels are driven direct with the outer ring floating while in a further modification the ring member may be driven and the sun-wheels floating.

When such a secondary epicyclic gear is employed in connection with a differential for use upon motor vehicles it may be necessary to have the planet wheels of the secondary epicyclic stepped so that one part may be in engagement with the outer encircling gear ring whilst the other part is in engagement with the sun wheel.

Figures 6, 7, 8 and 9 show such an arrangement and sufficient space is thereby secured to provide for an amply strong axle shaft through the sun wheel $c^1$ and planetary carrier $a^{11}$. The speeds are secured in a similar way to that already described, but it is preferably arranged to slide the parts on splines as follows, namely the plate $p$ on $a^{11}$ and the plate $c^2$ on the secondary sun wheel $c^1$. Clutching and de-clutching can thus take place by sliding these plates only, all parts of the gear transmission remaining in full contact. In passing from third speed to second and vice versa it is necessary that the dog clutch between the plates $c^2$ and $p$ shall remain in full engagement, and will continue to remain in contact for fourth speed also, therefore the forks actuating same must move in unison. This is taken care of by the correct formation of the cam-plate combination shown in Figure 10 and hereinafter described.

Figures 14, 15:
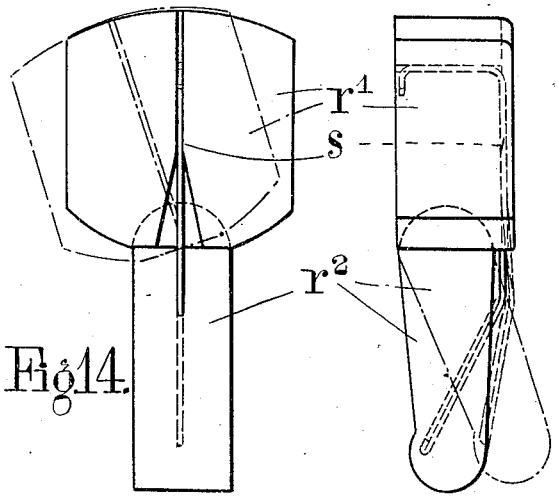

As before dog clutches or the like may be employed for putting the various parts into and out of action but Figures 11 to 15 show a form of clutch which I prefer to employ in such case and which comprises an inner member $r$ carrying a plurality of rocking blocks $r^1$ each of which is mounted on the spherical end of a movable strut $r^2$ and each of which has its outer face struck with a radius which is somewhat longer than the radius from the centre of the spherical portion to the face, so that in this way as the block rocks over in the manner shown dotted in Figure 14 a wedging action is obtained which forces the blocks into close contact with the outer ring $e$ and solid with the inner collar upon which the rocking struts are mounted, the collar in each case being slidably keyed to the bosses of the main and secondary sun wheels. This sliding collar shown at $r^3$ in Figure 6 raises the struts to contact the blocks and releases them as desired.

This form of clutch may be made single acting so as to give a free wheel action to the drive by cutting away the block from its centre line to the end of the outer face to a radius struck from the centre of the ball end of the movable strut or to a less radius, the radius of such altered curve being thus the same or less than the distance from the centre of the spherical end to the centre of the block $r$, so giving no wedge action in that particular direction. Each block may be provided with a wire or other spring $s$ to return it to its normal position when required.

An alternative form of clutch suitable for this form of gear is shown in Figure 16 and consists of a plurality of blocks $t$, each of which forms the inner race for a roller $t^1$ carried in an outer ring cage $t^2$. When the inner blocks are pushed forward (shown by the dotted position) by the action of the struts and collar (which may be similar to those above described) the rollers are jammed due to the flattening of the outer faces of the blocks $t$ so that again a clutching action is obtained. This form also may be made single acting by easing off one end of each of the blocks $t$ and either of the clutch members described is capable of driving either from the inner member or the outer member as may be required. In the second form of clutch the spring wire s may be employed for returning the cage of the rollers to its central position.

Figure 6:
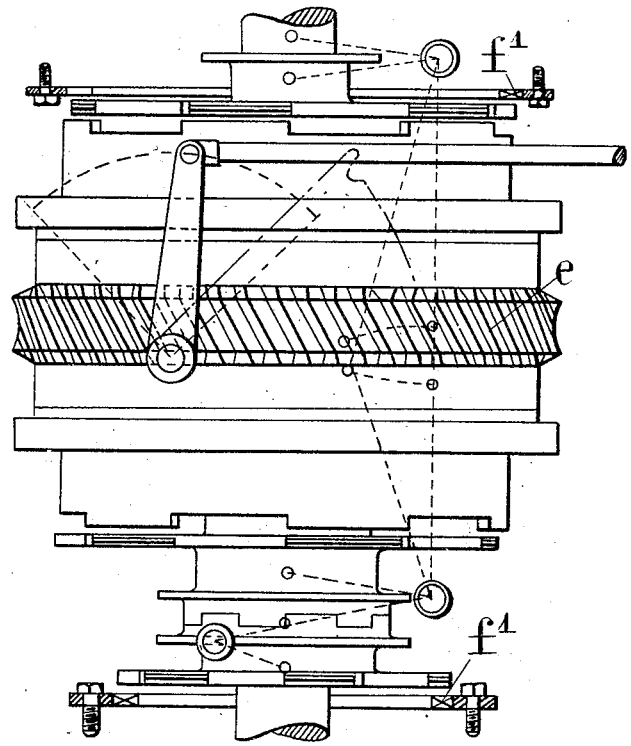
Figure 10:
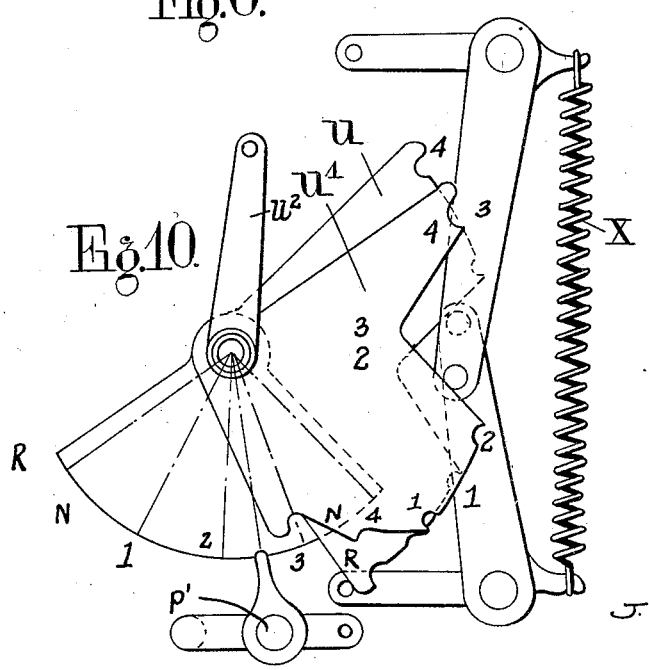
Figure 10 shows details of one form of hand gear control.

The movements of the various movable parts of the herein described mechanisms for gear changing may be controlled by means of a single lever or two or more levers (which may or may not move in unison) provided in conjunction with a gate of suitable form and a series of cams or a combination of links and cranks or eccentrics or any other suitable means may be adopted for the same purpose. Thus, for example, Figures 6 and 10 illustrate one convenient arrangement in conjunction with the mechanism of Figures 4, 5, 6, 7, 8, 9, 11 and 12 but which may be employed in association with other mechanisms in accordance with the invention and which comprises two plates or discs $u$ $u^1$ secured together but with a short space between them controlled by one or more distance pieces, the plates being capable of rotation and having properly positioned slots or cam faces thereon allowing the clutches to act at appropriate times for the different speeds as the discs are partially rotated by the control lever or levers, and such discs also operate upon supplementary levers for the purpose of operating the parts for the first speed and reverse, the positions for reverse, neutral, first, second, third and fourth speeds being indicated in the drawings by the references R N 1, 2, 3, and 4. The levers in Figure 6 are indicated clearly by dotted lines, and Figure 10 shows one cam formation. The tension spring $x$ maintains contact between the rollers on the lever ends and the cam surfaces, but it is evident that grooves may be formed to guide the rollers and lever movement should same be found more suitable.

If necessary or desirable a suitable stop or stops may be provided in association with the plates for the purpose of limiting rotation, and a detent or detents may co-operate with recesses in the outer edges of the plates for the purpose of temporarily holding the same in any particular control position, or the rollers on levers, as shown, may act as holders when the plates are partially revolved by the lever connection $u^2$.

Figures 17 and 18 illustrate one convenient form of change speed lever that may be employed for giving both longitudinal and rotational movements of the gear control member, and Figure 19 shows a suitable form of gate that may be employed in connection therewith.

In this a long pinion is formed on the control rod $o^1$ and is free to slide endwise in a small planetary gear with fixed pins carrying the planet wheels and attached to a strong bracket from the frame. From the outer ring an extension carries a pivotal support for the hand lever. Longitudinal movement of this (as shown in Figure 17) gives a corresponding movement to the control rod, whilst a side to side or cross movement (shown in Figure 18) gives a rotary result for the controls; in the arrangement shown 60° approximately angular movement of the hand lever secures approximately 180° movement as required for the control further illustrated in Figures 1 and 2.

It is to be understood that the invention is not to be confined to the foregoing details of construction which are given by way of example only nor to the particular application given for the purposes of illustration since the invention may be applied to change speed gears required for purposes other than for use upon self-propelled vehicles (in which case a differential would not ordinarily be necessary) and I may modify the form and arrangements of the gearing and the component parts thereof to suit the purpose for which the gear is required or any practical requirements that may have to be fulfilled.

Having now described my invention, what I claim as new and desire to secure by Letters Patent is:—

1. Change-speed gear according to claim 8 in which pawls are provided adapted to engage with notched rings in order to hold the said sun wheels and ring member against rotation.

2. Change-speed gear according to claim 8 in which means are provided adapted to lock the secondary epicyclic solid.

3. Change speed gear comprising in combination a main driving member, a driven member and a control member, a primary epicyclic gear operatively associated with said driving member and with the driven member, a secondary epicyclic gear operatively associated with said driving member and with said control member, a sun wheel for the primary epicyclic mounted upon said driven member, a plurality of planet wheels engaged with said sun wheel, a carrier for said planet wheels formed upon said driven member, a sun wheel for the secondary epicyclic loosely mounted on said control member, a plurality of planets engaged with this latter sun wheel, a carrier for such planets formed upon said control member, an annular ring member mounted upon the planet wheels of the primary and secondary epicyclic gears, a driving member encircling said annular ring member, a main driving member positively engaged with said encircling driving member, a casing enclosing said members, clutches adapted to connect the sun wheel of the primary and secondary epicyclic gears to the encircling driving member, means associated with each of said sun wheels and adapted to co-operate with means carried by the said casing for the purpose of holding the sun wheels to the casing and means adapted to connect the sun wheel of the secondary epicyclic to the said control member carrying such epicyclic.

4. Change speed gear comprising in combination a main driving member, a driven member and a control member, a primary epicyclic gear operatively associated with said driving member and driven member and including a sun wheel mounted upon the latter, a secondary epicyclic gear operatively associated with said driving member and said control member and, including a sun wheel loosely mounted upon the latter, a pair of separate planet carriers mounted between the driven member and the control member, a plurality of planet wheels on said carriers and engaged with the said sun wheels, a floating ring member carried by the planet wheels of the primary and secondary epicyclic gears, a driving member encircling said ring member and common to the primary and secondary epicyclic gears, said driving member being positively associated with the main driving member, friction clutches adapted to connect the said encircling driving member with the sun wheels of the primary and secondary epicyclic gears and comprising an inner member associated with each sun wheel, a plurality of rocking blocks carried by said inner members, each of said blocks being mounted on the spherical end of a movable strut and each of which has its outer face struck with a radius which is somewhat longer than the radius from the centre of the spherical portion to said face and a slidably mounted collar, the operation of said friction clutches being such that when the struts are in a vertical position and the said blocks are rocked a wedging action is obtained which forces the blocks into close contact with the said encircling driving member and solid with the inner collar and member upon which the struts are mounted, also means adapted to hold the said sun wheels against rotation.

5. Epicyclic change-speed gearing embodying sun and planet wheels, a ring member meshing with said planet wheels, a driving member encircling said ring member, a secondary epicyclic gear in conjunction with said ring member including a sun wheel and cage-carried planet wheels, and clutch means controlling said secondary epicyclic gear in order to obtain the lowest forward speed and a reverse, the encircling driving member being associated with both epicyclic gears and forming a common driving member for the latter.

6. Epicyclic change-speed gearing embodying sun and planet wheels, a ring member meshing with said planet wheels, a driving member encircling said ring member, a secondary epicyclic gear in conjunction with said ring member including a sun wheel and cage-carried planet wheels, and clutch means controlling said secondary epicyclic gear in order to obtain the lowest forward speed and a reverse, said ring member being common to both epicyclic gears and being arranged as a floating member meshing with the planet wheels of the epicyclic gears.

7. Change-speed epicyclic gearing embodying planet wheels, a ring member meshing with said planet wheels, a driving member encircling said ring member, a sun wheel mounted upon a driven member and meshing with the planet wheels and forming therewith one epicyclic gear, a control member, another sun wheel and a planet wheel mounted thereon, forming a second epicyclic gear, means for locking the control member of the epicyclic gear so that this gear is put out of action while the first epicyclic gear is in operation to give three forward speeds, means whereby the drive from the encircling driving member may be taken by one or the other of said sun wheels in order to yield two different forward speeds, means whereby the drive from the encircling driving member may be taken simultaneously by said sun wheels and so effect a solid drive in order to yield the fourth forward speed and means whereby the said second epicyclic gear which is locked during the obtaining of three forward speeds is put into operation in order to yield the lowest forward speed and a reverse drive.

8. Epicyclic change-speed gear comprising in combination a main driving member, a driven member and a control member, primary and secondary epicyclic gears operatively associated with the driving member and with the said driven member and control member respectively, a sun wheel mounted on said driven member and another sun wheel mounted on said control member, a plurality of planet wheels meshing with each of said sun wheels, separate carriers for the planets of each epicyclic gear, an annular ring member common to both epicyclic gears and meshing with the planet wheels of the latter, a driving member encircling said annular ring member, clutches adapted to connect said encircling driving member with the sun wheels of the primary and secondary epicyclic gears and means for locking the sun wheels against rotation.

In testimony whereof I have signed my name to this specification.

JOHN HENRY CHAMBERS.